(12) United States Patent
Radulescu et al.

(10) Patent No.: US 7,961,604 B2
(45) Date of Patent: Jun. 14, 2011

(54) PROCESSING SYSTEM AND METHOD FOR TRANSMITTING DATA

(75) Inventors: Andrei Radulescu, Eindhoven (NL); Kees Gerard Willem Goossens, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 841 days.

(21) Appl. No.: 10/555,401

(22) PCT Filed: May 4, 2004

(86) PCT No.: PCT/IB2004/050577
§ 371 (c)(1),
(2), (4) Date: Nov. 2, 2005

(87) PCT Pub. No.: WO2004/100006
PCT Pub. Date: Nov. 18, 2004

(65) Prior Publication Data
US 2006/0253604 A1    Nov. 9, 2006

(30) Foreign Application Priority Data
May 7, 2003 (EP) ................................. 03101263

(51) Int. Cl.
*H04L 12/26* (2006.01)
*H04L 12/40* (2006.01)
*G06F 15/16* (2006.01)

(52) U.S. Cl. ......... 370/229; 370/252; 370/438; 709/250

(58) Field of Classification Search .............. 370/229, 370/230, 235, 238, 238.1, 252, 438, 439, 370/440, 463; 709/208, 213, 214, 250
See application file for complete search history.

(56) References Cited

U.S. PATENT DOCUMENTS

| | | | |
|---|---|---|---|
| 5,388,241 A | | 2/1995 | Athas |
| 5,745,684 A | * | 4/1998 | Oskouy et al. ............... 709/250 |
| 5,768,529 A | | 6/1998 | Nikel et al. |
| 5,870,533 A | * | 2/1999 | Takagi ......................... 358/1.15 |
| 6,088,753 A | | 7/2000 | Sheafor et al. |
| 6,101,194 A | * | 8/2000 | Annapareddy et al. ....... 370/447 |
| 6,182,183 B1 | * | 1/2001 | Wingard et al. ............. 710/305 |
| 2003/0065862 A1 | * | 4/2003 | Wyland ........................ 710/305 |
| 2006/0120282 A1 | * | 6/2006 | Carlson et al. ............... 370/229 |

FOREIGN PATENT DOCUMENTS

| | | |
|---|---|---|
| EP | 0774717 A1 | 5/1997 |
| JP | 10269169 A | 9/1998 |
| WO | 0029961 A1 | 5/2000 |
| WO | 0039682 A1 | 7/2000 |
| WO | 02097644 A2 | 12/2002 |

* cited by examiner

Primary Examiner — Aung S Moe
Assistant Examiner — Kerri M Rose

(57) ABSTRACT

A method for exchanging data between first and second functional units includes the following steps. In a first handshake procedure, data is exchanged corresponding to a communication thread selected by the first functional unit, while independently in a second handshake procedure, information relating to a status of at least one communication thread is exchanged from the second to the first functional unit. The information enables the first functional unit to anticipate the possibility of exchanging data for the at least one communication thread.

19 Claims, 3 Drawing Sheets

PROCESSING SYSTEM AND METHOD FOR TRANSMITTING DATA

Figure 1:
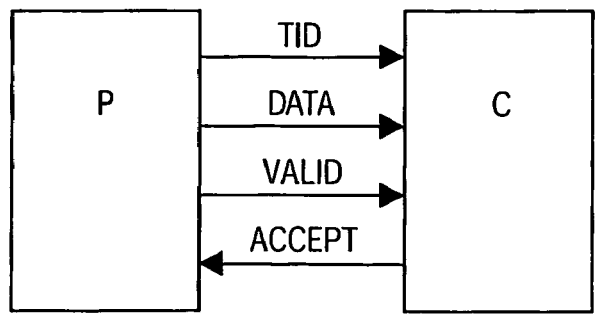

The invention relates to a processing system and method for exchanging data between a first and a second functional unit, comprising the following steps:

in a first handshake procedure, data is exchanged corresponding to a communication thread (TID) selected by the first functional unit (I), while independently in a second handshake procedure, information relating to a status of at least one communication thread is exchanged from the second (T) to the first functional unit (I) characterized in that, the information enables the first functional unit (I) to anticipate the possibility of exchanging data for at least one communication thread.

The first handshake wherein data is exchanged from a first to a second functional unit may be part of a chain of data transactions from a source functional unit via one or more intermediate functional units to a destination functional unit. The first functional unit, initiating the first handshake is also denoted as initiator or initiator functional unit. The second functional unit is denoted as target, or target functional unit.

With such a chain of data transactions a message can be sent by the source functional unit to the destination functional unit. The message may comprise a command an addresses and/or other data. The destination functional unit may on its turn send a message to the source functional unit. A functional unit can be any unit involved in a data stream for example a unit which performs operations on data, such as a CPU, a DSP or a VLIW, or a unit for storing data such as a memory, or a unit for transmitting data such as a router or an interface.

A split protocol is defined as a protocol wherein transactions are split in a request and a response. After a transmission of a request is completed from a source functional unit to the first intermediate functional in the communication path the source functional unit can proceed with a next transmission, instead of having to wait for a response to that request from the destination functional unit. The destination or any intermediate functional unit will start a separate arbitration procedure if necessary to give a response. A split bus protocol is more efficient when a response generation at the slave takes time. Pipelining allows a master to have multiple outstanding requests (i.e., requests waiting for a response). All transactions within the same communication thread are ordered: Requests are executed by the slave in the same order as the requests for those responses were issued by a master, and responses are delivered in the same order as the requests for those responses were issued by a master.

A communication thread can be used to identify a data stream between different processes or data streams originating from different source functional units. Transactions with different communication threads do not have any ordering constraints.

A message sent by a source functional unit may comprise a command, an address and/or other data. It is forwarded via one or more intermediate functional units until it arrives at the destination functional unit. The destination functional unit may on its turn send a message to the source functional unit.

U.S. Pat. No. 6,182,183 provides a link level protocol for exchanging the message between two subsequent functional units in the path from the source functional unit to the destination functional unit. According to the known protocol a master functional unit produces information, e.g. a command (Cmd), an address (Addr), or data (DataReq) and at the same time provides an identification of the thread (ReqThreadID) to which the information belongs. Likewise the slave functional unit may provide information (DataResp), and indicate the stream to which it belongs by an identification RespThreadID.

In addition the slave can provide the master information relating to the status of a communication thread (ReqThreadBusy). This allows the slave to indicate to the master that it cannot take any new requests associated with certain threads. In one embodiment, the ReqThreadBusy signal is a vector having one signal per thread, and a signal asserted indicates that the associated thread is busy. Analogously a response thread busy (RespThreadBusy) signal allows the master to indicate to the slave that it cannot take any responses associated with certain threads.

The ThreadBusy information (ReqThreadBusy and RespThreadBusy) prevents that the initiator attempts to initiate a transmission in vain. Instead it can initiate a transmission for another communication thread if that is available. Hence, this information contributes to a more efficient communication. However, if all threads are busy communication is still blocked.

In the improved method according to the invention the information given by the target functional unit is not only indicative whether a request or a response for a certain thread can be handled at the moment that the information is provided but the information also enables the first functional unit (I) to anticipate the possibility of exchanging data for at least one communication thread.

In this way a scheduler in the initiator functional unit is better enabled to schedule in which order transmissions for the different communication threads should be handled.

In another embodiment, information indicative for the filling degree of a buffer for a particular communication thread indicates the initiator how long data transmission can go on before a buffer overflow occurs. This enables the first functional unit (I) to anticipate a termination of the possibility of exchanging data for that communication thread.

In another embodiment, the information indicative for an expected waiting time enables the first functional unit (I) to anticipate when new data will be provided or when new data can be accepted. The second functional unit may for example need a relatively long processing time to calculate a result vector from two input vectors. It may indicate to a first functional unit to which the result vector will be transmitted an indication for the remaining processing time. A scheduler in that first functional unit may then schedule a data transmission at a time that the result vector is expected to be ready.

For example it may schedule the data transmission at a time that buffer overflow tends to occur for another communication thread. Likewise it may provide this indication to a first functional unit which provides an input vector, which may use this information in its scheduling.

By providing information to the first functional unit (I) which enables it to anticipate the possibility of exchanging data for a communication thread it can better schedule transmissions for the different communication threads. This makes it possible to reduce the occurrence of a simultaneous unavailability of all communication threads.

The present invention is in particular relevant for a system on silicon implemented as plurality of functional units in a network. Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages. The communication network comprises a plurality of partly connected nodes. Messages from a module are redirected by the nodes to one or more other nodes. This implies that many information streams will pass between a pair of an initiator and a target unit. The present invention facilitates the scheduling of these streams.

Figure 2:
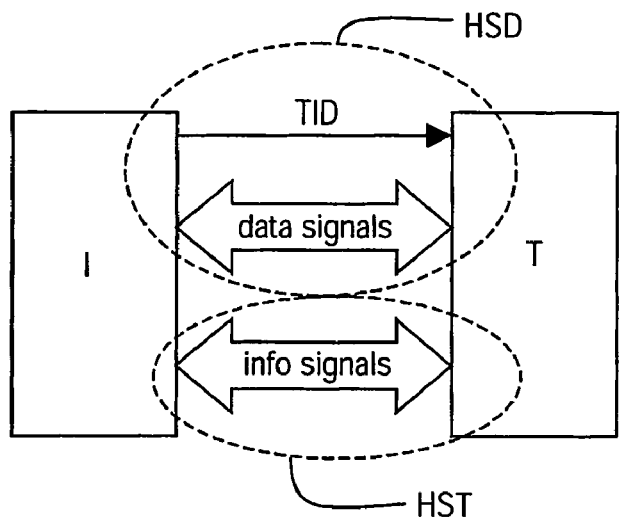
Figure 3:
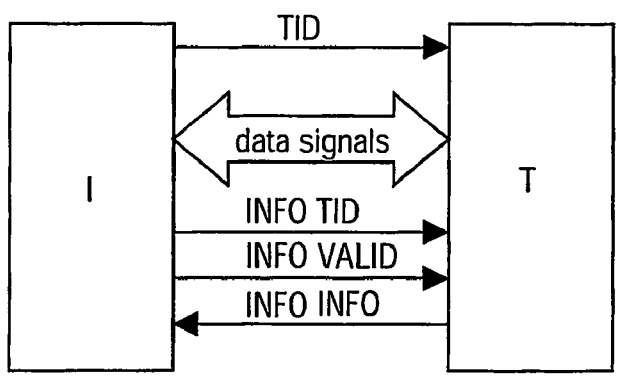
Figure 4:
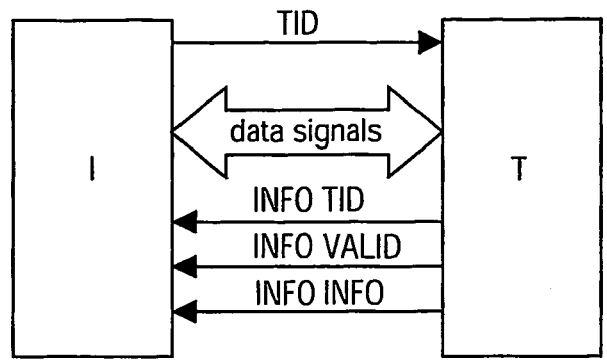
Figure 5:
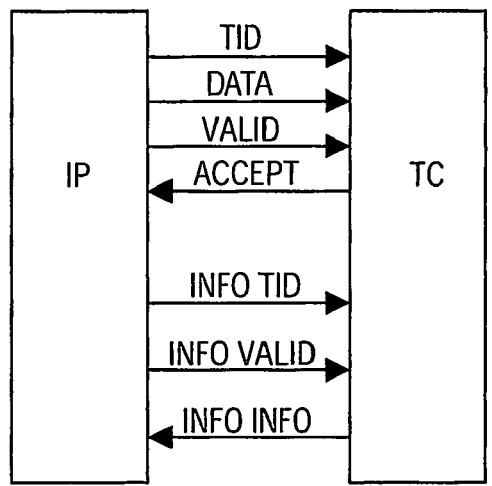
Figure 6:
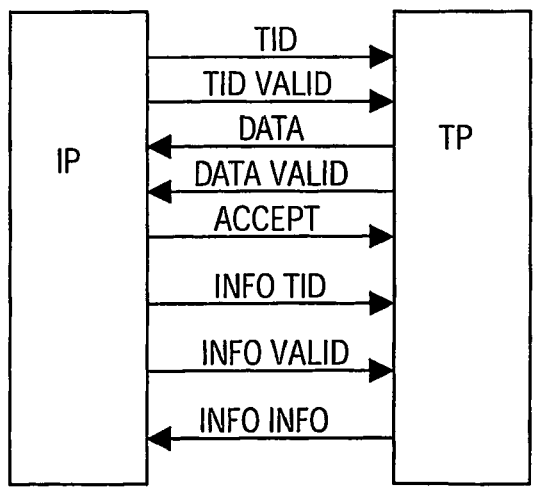
Figure 7:
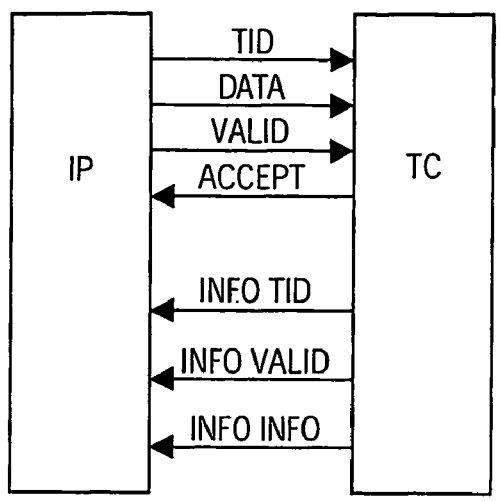
Figure 8:
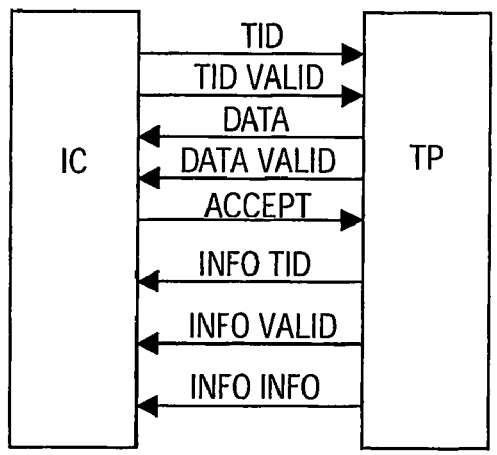
Figure 9:
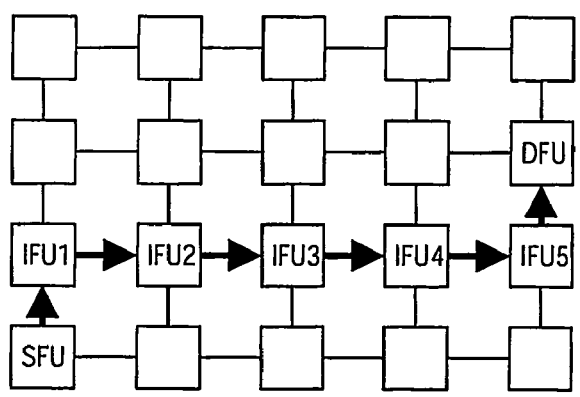

These and other aspects are described in more detail with reference to the drawings. Therein:

FIG. 1 shows a conventional method for exchanging data,

FIG. 2 schematically shows a method for exchanging data according to the invention, FIG. 3 shows a first embodiment of the method according to the invention, FIG. 4 shows a second embodiment of the method according to the invention, FIG. 5 shows a first example of the first embodiment, FIG. 6 shows a second example of the first embodiment, FIG. 7 shows a first example of the second embodiment, FIG. 8 shows a second example of the second embodiment, FIG. 9 shows a network comprising a plurality of functional units according to the invention.

FIG. 1 shows a conventional method for exchanging data. Therein a first processing unit (P) provides an identification for a communication thread TID, data for that thread DATA and signals validity with a signal VALID. If the second processing unit can accept the thread it signals this with the signal ACCEPT.

FIG. 2 schematically shows a method according to the invention for exchanging data between a first and a second functional unit. The method comprises the following steps. In a first handshake procedure data (HSD) is exchanged corresponding to a communication thread (TID) selected by the first (I) and the second functional unit (T). At the same time second information is exchanged in a second handshake procedure (HST) from the first (I) to the second functional unit (T) relating to a status of at least one communication thread from the second (T) to the first functional unit (I). The information enables the first functional unit (I) to anticipate the possibility of exchanging data for the at least one communication thread.

The first handshake for transmission of the data can be either a classic handshake, as used in VCI, OCP (as will be illustrated in more detail in FIGS. 5 and 7), or an extended handshake in which feedback is provided on whether a transaction can proceed or not on a TID (see FIGS. 6 and 8). This basic group of signals is extended with another group of signals, as an independent dialog to gather information on which communication threads data can be scheduled without stall.

The first and the second handshakes HSD and HST are independent and thus they can proceed in parallel. The information collected from the second handshake HST is used by the initiator to schedule communications for different communication threads efficiently.

In a practical example the second handshake HST comprises the exchange of a first signal INFO TID, a second signal INFO VALID, and a third signal INFO INFO. The first signal INFO TID is indicative for a particular communication thread. The second signal INFO VALID indicates whether the signal INFO TID is valid or not. The third signal INFO INFO can have different meanings, depending on the further implementation of the protocol. It may for example indicate an expected waiting time, i.e. indicating when data will become available or when data can be accepted for the thread identified with the signal INFO TID. Otherwise the signal may for example indicate the filling degree of a buffer. This information helps a data consuming initiator to estimate how long a data producing target can continue with providing data from its buffer. This may be a best case estimate or a worst case estimate. A worst case estimate can be made calculating the time necessary the read the present contents of the buffer. A best case estimate can be made by assuming that the data producing target keeps supplying data at a certain rate. In practice the target may in the mean time generate new data. Likewise it may help a data producing initiator to estimate how long a data consuming target can continue with accepting data. Also, this is a worst case estimate. In practice the target may in the mean time process data stored in its buffer. A best case estimate can be made taking an average rate into account with which the data is processed.

In the scheme, shown in FIG. 3, the initiator requests (polls for) communication thread information from the target. Information is requested for one communication thread at a time, by indicating a communication thread with the INFO TID signals and rising INFO VALID. The target provides information on INFO INFO signals (in this case in a fixed number of cycles).

For this scheme multiple different handshakes schemes can be defined. One example is to have a valid signal (INFO VALID) to announce that information about the communication thread identified with INFO TID is requested. It will be held high during a predetermined time-interval, e.g. one cycle, and the response (INFO INFO) will come in fixed number of cycles (e.g., 1). Another example, which allows the target to delay the response is to keep the valid signal (VALID INFO) high until a response is coming. The response is signaled with an accept signal for a single cycle in which also the response is given (INFO INFO).

Examples of the polling scheme where the initiator is a producer and a consumer are shown in more detail in FIGS. 5 and 6, respectively. For a producer initiator, the consumer target may for example provide information indicative for the amount of buffer space available to accept data on the given communication thread. A producer target may for example provide a consumer initiator, how much data is available in the given communication thread, or indicate with which frequency it provides new data.

In the second scheme, shown in FIG. 4, the target drives the flow of information towards the initiator. An example of the information that can be provided to the initiator consists of updates, differential or absolute, (similar to interrupts) to how many handshakes can be performed on a given communication thread without stall. Different handshake schemes are also possible, as in the previous extension.

Examples of the interrupt scheme where the initiator is a producer and a consumer are shown in FIGS. 7 and 8, respectively. For a producer initiator, the consumer target could notify the initiator on each new empty buffer place (or group of buffer places) that becomes available on a given communication thread. For a consumer initiator, the producer target could notify the initiator about each new data element (or group of data elements) that becomes available.

The two proposed schemes are both applicable in different contexts. If the initiator is a CPU, the polling scheme (which checks every appropriate communication thread to decide which will be scheduled next) may have lower cost. The interrupt scheme would require notifications to be treated as interrupts whose handling has high cost because they require context switches.

For a dedicated functional unit, the interrupt scheme, which is similar to flow control, has a low cost because it will only cause a counter update for example. The communication thread scheduler has always the latest necessary information and can proceed immediately.

As opposed to this, the poll scheme, where the dedicated functional unit polls for information, either consumes precious cycles before a scheduling decision, or it uses incomplete information, thus, lowering the scheduling quality.

In case a functional unit does not support these extensions, it can still be used with each of the extended schemes presented above, because the basic handshake is not changed and the additional group of signals can be ignored by defaulting INFO VALID to a low value.

Connecting an initiator not supporting such an extension with a target supporting one of these extensions can be done by simply ignoring the info group. For the polling scheme, the target will not get any poll, and therefore will not produce any information.

For the interrupt scheme, the produced information will be ignored. Connecting an initiator supporting one of these extensions with a target not supporting such an extension requires the initiator to be designed such that it can still schedule communications even without the information from targets.

To connect an initiator functional unit supporting the polling scheme with a target functional unit supporting the interrupt scheme, a small adapter must be inserted between the two functional units where notifications from the targets are stored to be delivered to the initiator when it polls for information. Also the data sent from the producer to the consumer must go through this adapter to update the handshake information. For example, in the case of a target consumer, the buffer filling (to be reported to the initiator by the adapter) will increase with the transferred data, and in the case of a target producer, the data availability (to be reported to the initiator by the adapter) will decrease with the transferred data.

Similarly, connecting an initiator supporting the interrupt scheme with a target supporting the polling scheme requires an adapter in between which polls the target and notifies the initiator about changes.

The two extensions cover the only two cases in which information about communication threads can be obtained via an additional handshake: (a) initiator polling for information, and (b) initiator getting notified about any change in the target The proposed scheme is relevant for device and system-level communication protocols which allow communication on independent communication-threads, such as VCI and OCP. It extends the existing link-level schemes to allow collecting information from target. This information is used by the initiator to obtain a better scheduling of communication threads on a link.

The proposed two schemes cover the only two cases in which information about communication threads can be obtained via an additional handshake: (a) initiator polling for information, and (b) initiator getting notified about any change in the consumer.

FIG. 9 schematically shows a data processing system, which comprises a network connecting a plurality of functional units. The processing system is arranged to transmit data and a communication thread identifier for said data according to a split protocol along a communication path (indicated by arrows) from a source functional unit SFU to a destination functional unit DFU via one or more intermediate functional units IFU1, ..., IFU5. The communication path includes at least a pair of an initiator and a target unit as illustrated with reference to one of the FIGS. 2 to 8. By transmitting the data together with a communication thread identifier, multiple unrelated transactions, having mutually different communication thread identifiers can evolve independently.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A method for exchanging data between a first functional unit and a second functional unit, comprising the following acts:
   in a first handshake procedure, exchanging data corresponding to a communication thread selected by the first functional unit;
   while independently in a second handshake procedure, exchanging information relating to a status of at least one communication thread from the second to the first functional unit;
   based on the information relating to the status, anticipating by the first functional unit a possibility of exchanging data the for at least one communication thread and for a further communication thread; and
   scheduling by the first functional unit a data transmission at a time when simultaneous unavailability of the at least one communication thread and the further communication thread is reduced;
   wherein the information is indicative of how often new data is to be provided, and wherein the first handshake procedure and the second handshake procedure occur at least partially simultaneously.

2. The method according to claim 1, wherein the information is indicative for a filling degree of a buffer reserved for the at least one communication thread.

3. The method of claim 1, wherein the information is indicative for an expected waiting time before a request relating to the at least one communication thread can be handled.

4. The method of claim 1, further comprising the act of ordering transactions within the communication thread so that requests from the first functional unit are executed by the second functional unit in a same order as the requests were issued by first functional unit, and responses from the second functional unit are delivered in the same order as the requests for the responses were issued by the first functional unit.

5. The method of claim 1, further comprising the acts of:
   providing a valid signal announcing request of the information about the at least one communication thread; and keeping the valid signal high until the information is provided.

6. A processing system comprising a first functional unit, a second functional unit, and a scheduler, the processing system being arranged to exchange data corresponding to a communication thread selected by the first functional unit in a first handshake procedure, while independently exchanging information relating to a status of at least one communication thread from the second to the first functional unit in a second handshake procedure, wherein the information enables the first functional unit to anticipate the possibility of exchanging data for the at least one communication thread and for a further communication thread, and wherein the information is indicative of how often new data is to be provided, and wherein the first handshake procedure and the second handshake procedure occur at least partially simultaneously, and wherein the scheduler is configured to schedule by the first functional unit a data transmission at a time when simultaneous unavailability of the at least one communication thread and the further communication thread is reduced.

7. The processing system according to claim 6, further comprising a plurality of functional units in a network, the processing system being arranged to transmit data and a communication thread identifier for said data according to a split protocol along a communication path from a source functional unit to a destination functional unit via one or more intermediate functional units, including a first functional unit and a second functional unit.

8. The processing system of claim 7, wherein the split protocol is configured to allow the source functional unit to have multiple outstanding requests that waiting for a response from the destination functional unit.

9. The processing system of claim 6, wherein the information is indicative for an expected waiting time before a request relating to the at least one communication thread can be handled.

10. The processing system of claim 6, wherein the second functional unit executes requests from the first functional unit in a same order as the requests were issued by first functional unit, and wherein the second functional unit delivers to the first functional unit responses to the requests in the same order as the requests were issued by first functional unit.

11. A method for exchanging data between a first functional unit and a second functional unit, comprising the following acts:

in a first handshake procedure, exchanging data corresponding to a communication thread selected by the first functional unit;

while independently in a second handshake procedure, exchanging information relating to a status of at least one communication thread from the second to the first functional unit; and based on the information relating to the status, anticipating by the first functional unit a possibility of exchanging data the for at least one communication thread;

wherein the information is indicative of how often new data is to be provided, and wherein the information is provided by the second functional unit and is indicative of a remaining processing time to calculate by the second functional unit a result.

12. The method of claim 11, further comprising the act of scheduling by the first functional unit a data transmission at a time that the result is expected to be ready.

13. A method for exchanging data between a first functional unit and a second functional unit, comprising the following acts:

in a first handshake procedure, exchanging data corresponding to a communication thread selected by the first functional unit;

while independently in a second handshake procedure, exchanging information relating to a status of at least one communication thread from the second to the first functional unit; and based on the information relating to the status, anticipating by the first functional unit a possibility of exchanging data the for at least one communication thread;

wherein the information is indicative of how often new data is to be provided, and further comprising the acts of:

providing a buffer reserved for the at least one communication thread; and scheduling by the first functional unit a data transmission at a time that an overflow of the buffer tends to occur for a further communication thread so that simultaneous unavailability of the at least one communication thread and the further communication thread is reduced.

14. A method for exchanging data between a first functional unit and a second functional unit, comprising the following acts:

in a first handshake procedure, exchanging data corresponding to a communication thread selected by the first functional unit;

while independently in a second handshake procedure, exchanging information relating to a status of at least one communication thread from the second to the first functional unit; and based on the information relating to the status, anticipating by the first functional unit a possibility of exchanging data the for at least one communication thread;

wherein the information is indicative of how often new data is to be provided, and further comprising the acts of:

providing a notice of each empty buffer that becomes available to the at least one communication thread; and providing a notice of each new data element that becomes available.

15. A processing system comprising a first functional unit and a second functional unit, the processing system being arranged to exchange data corresponding to a communication thread selected by the first functional unit in a first handshake procedure, while independently exchanging information relating to a status of at least one communication thread from the second to the first functional unit in a second handshake procedure, wherein the information enables the first functional unit to anticipate the possibility of exchanging data for the at least one communication thread, and wherein the information is indicative of how often new data is to be provided, wherein the information is provided by the second functional unit and is indicative of a remaining processing time to calculate by the second functional unit a result.

16. The processing system of claim 15, further comprising the act of scheduling by the first functional unit a data transmission at a time that the result is expected to be ready.

17. A processing system comprising a first functional unit and a second functional unit, the processing system being arranged to exchange data corresponding to a communication thread selected by the first functional unit in a first handshake procedure, while independently exchanging information relating to a status of at least one communication thread from the second to the first functional unit in a second handshake procedure, wherein the information enables the first functional unit to anticipate the possibility of exchanging data for the at least one communication thread, and wherein the information is indicative of how often new data is to be provided, further comprising:

a buffer reserved for the at least one communication thread; and a scheduler for scheduling by the first functional unit a data transmission at a time that an overflow of the buffer tends to occur for a further communication thread so that simultaneous unavailability of the at least one communication thread and the further communication thread is reduced.

18. A processing system comprising a first functional unit, a second functional unit, and a scheduler, the processing system being arranged to exchange data corresponding to a communication thread selected by the first functional unit in a first handshake procedure, while independently exchanging information relating to a status of at least one communication thread from the second to the first functional unit in a second handshake procedure, wherein the information enables the first functional unit to anticipate the possibility of exchanging data for the at least one communication thread and for a further communication thread, wherein the information is indicative of how often new data is to be provided, wherein the first functional unit provides a valid signal announcing request of the information about the at least one communication thread, and keeps the valid signal high until the information is provided, and wherein the scheduler is configured to schedule by the first functional unit a data transmission at a time when simultaneous unavailability of the at least one communication thread and the further communication thread is reduced.

19. A processing system comprising a first functional unit and a second functional unit, the processing system being arranged to exchange data corresponding to a communication thread selected by the first functional unit in a first handshake procedure, while independently exchanging information relating to a status of at least one communication thread from the second to the first functional unit in a second handshake procedure, wherein the information enables the first functional unit to anticipate the possibility of exchanging data for the at least one communication thread, and wherein the information is indicative of how often new data is to be provided, wherein at least one of the first functional unit and the second functional unit provides a notice of each empty buffer that becomes available to the at least one communication thread, and provides a notice of each new data element that becomes available.

\* \* \* \* \*